United States Patent
Duet et al.

(10) Patent No.: US 9,893,959 B1
(45) Date of Patent: Feb. 13, 2018

(54) RESOURCE MODELING LANGUAGE TO SPECIFY AND CONTROL THE PLACEMENT OF RESOURCES IN A CLOUD ENVIRONMENT

(71) Applicant: Goldman, Sachs & Co., New York, NY (US)

(72) Inventors: Donald J. Duet, New York, NY (US); J Ram, Montclair, NJ (US); Shapour Neshatfar, Jersey City, NJ (US)

(73) Assignee: Goldman Sachs & Co. LLC, New York, NY (US)

( * ) Notice: Subject to any disclaimer, the term of this patent is extended or adjusted under 35 U.S.C. 154(b) by 444 days.

(21) Appl. No.: 14/615,289

(22) Filed: Feb. 5, 2015

Related U.S. Application Data

(60) Provisional application No. 61/936,047, filed on Feb. 5, 2014.

(51) Int. Cl.
*G06F 15/173* (2006.01)
*H04L 12/24* (2006.01)
*H04L 29/08* (2006.01)

(52) U.S. Cl.
CPC .......... *H04L 41/5054* (2013.01); *H04L 67/10* (2013.01)

(58) Field of Classification Search
USPC .................................. 709/223, 213; 711/170
See application file for complete search history.

(56) References Cited

U.S. PATENT DOCUMENTS

| | | | |
|---|---|---|---|
| 8,812,612 B1 * | 8/2014 | Laier ................. | G06F 17/30132 709/213 |
| 2014/0136809 A1 * | 5/2014 | Engle ..................... | G06F 3/067 711/170 |

* cited by examiner

*Primary Examiner* — Tammy Nguyen

(57) ABSTRACT

System and method for modeling resource requirements using a resource modeling language to specify and control the placement of resources in a cloud environment are disclosed. Modeling the resource requirements provides control over placement of resources when resiliency, latency and/or other requirements are imposed. In some embodiments, the resource modeling language enables a client to specify number, type and specification of resources as well as set of relationships among the resources. In various embodiments, the system receives via a user interface resource modeling information including specification of one or more resources and a set of rules for placement of the one or more resources in a cloud environment. The system then creates a model based on the resource modeling information, which is stored in a datastore. In response to a request, the system places an order with a cloud controller to instantiate the model in the cloud environment.

22 Claims, 6 Drawing Sheets

RESOURCE MODELING LANGUAGE TO SPECIFY AND CONTROL THE PLACEMENT OF RESOURCES IN A CLOUD ENVIRONMENT

CROSS-REFERENCE TO RELATED APPLICATION(S)

This application claims priority to and benefit from U.S. Provisional Patent Application Ser. No. 61/936,047 titled "Resource Modeling to Specify and Control Placement of Resources in a Cloud Environment" filed on Feb. 5, 2014, the entire content of which is expressly incorporated by reference herein.

BACKGROUND

According to the National Institute of Standards and Technology (NIST), "cloud computing" is defined as "a model for enabling ubiquitous, convenient, on-demand network access to a shared pool of configurable computing resources (e.g., networks, servers, storage, applications, and services) that can be rapidly provisioned and released with minimal management effort or service provider interaction." One of the characteristics of the cloud model is resource pooling, which allows computing resources to be pooled to serve multiple customers using a multi-tenant model. Physical and virtual resources can then be dynamically assigned and re-assigned according to customer demand. Because of these and other benefits, many organizations are moving their applications to the cloud. The cloud model can be deployed in the form of a private cloud, a community cloud, a public cloud or a hybrid cloud. According to NIST, a private cloud is a cloud infrastructure provisioned for exclusive use by a single organization comprising multiple consumers (e.g., business units). The private cloud may be owned, managed, and operated by the organization, a third party, or some combination thereof, and it may exist on or off premises. As used herein, a "cloud provider" is a service provider that offers customers storage and/or software (e.g., application) services available via a cloud, which may be private, public, community, or hybrid cloud.

For any non-trivial application, it is highly desirable to formally define its resource (e.g., compute, database (DB), messaging, storage, etc.) requirements in a given environment. It is even more critical in a cloud environment, which deploys a large number of applications, to have concise resource requirements because the resources requirements are tightly coupled with managing the inventory, utilization, cost and more importantly managing risk associated with not having the resource when needed. For example, consider an organization that has thousands of applications which utilize hundreds of thousands of resources deployed in a cloud environment. If the resource requirements for every application are known and the proper utilization of the resources after the resources were allocated to a given application can be validated, the organization would be able to, for example, efficiently manage its inventory and application workloads to achieve optimal utilization of the resources.

Customers can typically specify the resource requirements of an application in a given environment by specifying the resource itself, and the placement requirements. For example, in case of "compute" resource, cloud providers allow customers to define a number of cores, memory, storage, etc., what software should run on a virtual machine (VM), how to configure a VM, and/or the like, as well as which datacenter or region the "compute" resource would live on. However, there are several limitations in the existing mechanism for specifying the resource requirements of an application. For example, the existing mechanism describes the resource requirements from cloud provider perspective, and not the customer or application perspective. Consequently, a typical resource specification is often tightly coupled to the cloud provider's infrastructure, which makes changing cloud providers difficult. By way of another example, the existing mechanism acts on the resources individually. In other words, the existing mechanism puts an absolute requirement (cloud provider specific) on the resource, which can cause problems in fulfilling a resource specification. For example, if the resource specification specifies that a "compute" resource be placed in datacenter "BDC," and if the datacenter "BDC" has no capacity, then the resource specification will not be fulfilled.

The present disclosure overcomes these and other limitations of existing mechanism for capturing and communicating resource specification, and provides other benefits as will become clearer to those skilled in the art from the foregoing description.

SUMMARY

Embodiments of the present disclosure include a method for creating a model for specifying and controlling placement of resources in a cloud environment that includes one or more datacenters in one or more regions on different subnets. The method comprises receiving, by a computer system, resource modeling information representing resource requirements of an application for deployment in the cloud environment, the resource modeling information including specification of the resources and a set of rules for placement of the resources in the cloud environment, wherein the set of rules define relationships among the resources, creating, by the computer system, a model based on the received resource modeling information, wherein creating the model includes translating the received resource modeling information into a set of constraints, and storing, by the computer system, the model including the set of constraints in a data repository that is coupled to the computer system.

Embodiments of the present disclosure include a system for creating a model for specifying and controlling placement of resources in a cloud environment that includes one or more datacenters in one or more regions on different subnets. The system comprises a memory, and a processor in communication with the memory, the processor being configured to receive resource modeling information representing resource requirements of an application for deployment in the cloud environment, the resource modeling information including specification of the resources and a set of rules for placement of the resources in the cloud environment, wherein the set of rules define relationships among the resources, create a model based on the received resource modeling information, wherein creating the model includes translating the received resource modeling information into a set of constraints, and store the model including the set of constraints in a data repository that is coupled to the computer system.

Embodiments of the present disclosure include a non-transitory computer-readable storage medium storing instructions which when executed by a processor, causes the processor to receive resource modeling information representing resource requirements of an application for deployment in the cloud environment, the resource modeling information including specification of the resources and a set of rules for placement of the resources in the cloud environment, wherein the set of rules define relationships among the resources, create a model based on the received resource modeling information, wherein creating the model includes translating the received resource modeling information into a set of constraints, and store the model including the set of constraints in a data repository that is coupled to the computer system.

Embodiments of the present disclosure include a method for creating a model for specifying and controlling placement of resources in a cloud environment that includes one or more datacenters, comprising receiving, via a user interface displayed on a client device, specification of the resources, including a number and type of the resources, and a set of rules for placement of the resources in the cloud environment, wherein the set of rules are in the form of constraints among the resources, creating a model for an application based on the specification of the resources and the set of rules for placement of the resources in the cloud environment, wherein the model represents resource requirements of the application, and placing an order identifying the model to a cloud controller system to cause the resources to be instantiated in the cloud environment in accordance with the model.

Embodiments of the present disclosure include a system for creating a model for specifying and controlling placement of resources in a cloud environment that includes one or more datacenters, comprising a memory, and a processor in communication with the memory, the processor being configured to receive, via a user interface displayed on a client device, specification of the resources, including a number and type of the resources, and a set of rules for placement of the resources in the cloud environment, wherein the set of rules are in the form of constraints among the resources, create a model for an application based on the specification of the resources and the set of rules for placement of the resources in the cloud environment, wherein the model represents resource requirements of the application, and place an order identifying the model to a cloud controller system to cause the resources to be instantiated in the cloud environment in accordance with the model.

Embodiments of the present disclosure include a non-transitory computer-readable storage medium storing instructions which when executed by a processor, causes the processor to receive, via a user interface displayed on a client device, specification of the resources, including a number and type of the resources, and a set of rules for placement of the resources in the cloud environment, wherein the set of rules are in the form of constraints among the resources, create a model for an application based on the specification of the resources and the set of rules for placement of the resources in the cloud environment, wherein the model represents resource requirements of the application, and place an order identifying the model to a cloud controller system to cause the resources to be instantiated in the cloud environment in accordance with the model.

Embodiments of the present disclosure include a method of creating a model of resource requirements of an application in a distributed computer network, comprises providing, for display on a client computer, a user interface that includes a plurality of icons representing a plurality of resources for graphically modeling the resource requirements of the application in the distributed computer network, in response to detecting at least two resource nodes corresponding to at least one of the plurality of icons has been dragged and dropped into a first area of the user interface displayed on the client computer, selecting the at least two resource nodes to create a group, and applying a constraint selected from a menu to the group, creating a model of the resource requirements of the application based on the at least two resource nodes and a relationship among the at least two nodes represented by the constraint, and storing the model as a template in a datastore.

Embodiments of the present disclosure include a system of creating a model of resource requirements of an application in a distributed computer network, comprising a memory, and a processor in communication with the memory, the processor being configured to provide, for display on a client computer, a user interface that includes a plurality of icons representing a plurality of resources for graphically modeling the resource requirements of the application in the distributed computer network, in response to detecting at least two resource nodes corresponding to at least one of the plurality of icons has been dragged and dropped into a first area of the user interface displayed on the client computer, selecting the at least two resource nodes to create a group, and applying a constraint selected from a menu to the group, create a model of the resource requirements of the application based on the at least two resource nodes and a relationship among the at least two nodes represented by the constraint, and store the model as a template in a datastore.

Embodiments of the present disclosure include a non-transitory computer-readable storage medium storing instructions which when executed by a processor, causes the processor to provide, for display on a client computer, a user interface that includes a plurality of icons representing a plurality of resources for graphically modeling the resource requirements of the application in the distributed computer network, in response to detecting at least two resource nodes corresponding to at least one of the plurality of icons has been dragged and dropped into a first area of the user interface displayed on the client computer, selecting the at least two resource nodes to create a group, and applying a constraint selected from a menu to the group, create a model of the resource requirements of the application based on the at least two resource nodes and a relationship among the at least two nodes represented by the constraint, and store the model as a template in a datastore.

DETAILED DESCRIPTION

Figure 1A:
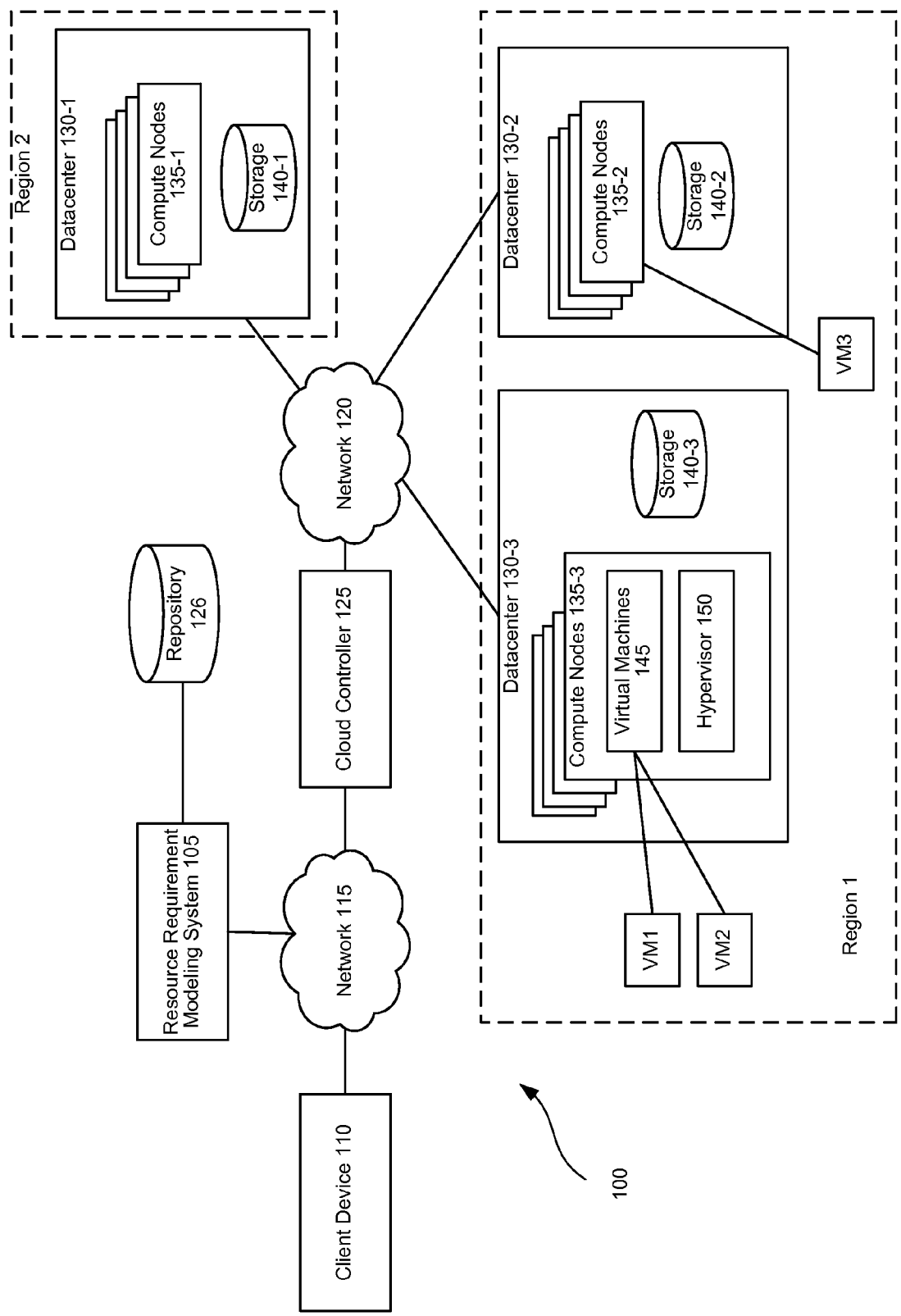
FIG. 1A illustrates an example environment implementing a networked cloud architecture in which a system for using resource modeling language to specify and control placement of resources in a cloud environment ("the system") can operate.

This disclosure describes a system and method for specifying and controlling placement of resources in a cloud environment comprising one or more data centers in one or more regions using a resource modeling language. The resources can include, but are not limited to: virtual machines (VMs), databases (DBs), messaging, storage, and/or the like. The resource modeling language is a constraint language that provides a set of notations and constructs to describe or model the resource requirements of any non-trivial application in a cloud environment. The resource modeling language represents the resource requirements of an application in relative (i.e., non-absolute) terms to capture the "intent" of the resource specification rather than the implementation.

For example, consider an "intent" to provide resiliency to an application. A typical resource specification would include the names of two datacenters (e.g. datacenters "CDC" and "BDC") where the databases and virtual machines should be placed. Instead of specifying the names of the datacenters, the modeling language can capture the resiliency requirement by specifying the relationships among the resources. For example, the modeling language can be used to specify that "DB1" and "VM1" be placed in the same datacenter, "DB2" and "VM2" be placed in the same datacenter, and "VM1" and "VM2" be placed in two different datacenters, but the same region. Using the modeling language, the above resource requirements can be formally specified as:

VM1.DataCenter !=VM2.DataCenter
VM1.Region=VM2.Region
VM1.DataCenter=DB1.DataCenter
VM2.DataCenter=DB2.DataCenter In some embodiments, clients (i.e., application owners requiring resources from the cloud) can use the modeling language or the graphical representation thereof to specify their resource requirements. These requirements are actually solutions for resiliency, performance, latency, availability, risk and/or other application problems. For example, consider an example resource requirement of an application: "4 VMs (VM1, VM2, VM3, VM4) and 1 Terabytes of storage." Using the modeling language, a model that represents the following rules defining relationships among the resources can be created.

(1) VM1 and VM2 should be on the same subnet,
(2) VM1 and VM3 on different datacenters but same Region,
(3) VM3 and VM4 on the same hypervisor, or
(4) VM1 and storage on the same datacenter.

Each rule listed above can address an application problem. For example, rule (1) can reduce latency as subnetting isolates traffic between VM1 and VM2 to the same subnet. Consequently, traffic between VM1 and VM2 will not have to traverse across subnet boundaries which can increase latency. Rule (2) can provide resiliency against datacenter failure, power outage or other disruption as even if one of the datacenters becomes unavailable, the other datacenter in the same region can be used. Similarly, rule (3) provides neighborhood control, and rule (4) reduces latency. Examples of other constraints that the modeling language can capture and represent in a model are listed below.

(1) Not more than two VMs for a message-broker residing on the same hypervisor. This rule can be created to mitigate risk.
(2) Only certain type of applications should be placed on a given hypervisor or cabinets. This rule can be created to address legal restrictions or risk mitigation.

Modeling the resource requirements in the manner described in this disclosure has several advantages. The resource requirements do not act on the resources themselves, but rather on the relationship between resources. As the above example illustrates, none of the datacenters, regions, databases or virtual machines are identified by their names such "DBC" or "CBC." In fact, the resource requirements conveyed by the modeling language would be applicable to any cloud provider environment. This makes it easier for an organization to migrate from one cloud provider to another. Moreover, modeling the resource requirements as disclosed herein describes the resources from the customer or application perspective. It enables the intent of the resource specification to be conveyed without a client (as used herein a "client" is an application owner or entity requesting resources from the cloud) having to be aware of all the physical attributes of a cloud offered by a cloud provider. Consequently, the client does not even need to know about the datacenters in which a given provider has presence in. Because the model is not tightly coupled to a particular physical entity such as a cloud provider's datacenter, there is more flexibility for fulfilling the resource specification and managing capacity. Using the above example, any two datacenters in the same region can be used to fulfill the resource specification. Even if there is no capacity in datacenter "BDC," datacenters "ADC" and "CDC" may be used to fulfill the order (i.e., resource specification). Consequently, modeling the resource requirements can result in a reduced likelihood of order failure.

In some embodiments, modeling the resource requirements enables the client to capture different aspects of a resource. A typical resource specification can, for example, specify a region and datacenter where a resource should live on, but not the cabinets, hypervisor or subnet where the resource could potentially live on. By capturing such low-level details in a resource specification, the modeling language disclosed herein enables a client to have a greater control on application performance to improve latency.

In some embodiments, modeling the resource requirements as disclosed in this application enables the resource requirements to be captured in a model (e.g., a deployment model) that can be stored in a repository, and can be used as template. The model can then be retrieved from the repository and deployed at any time, and however many times as desired in any suitable cloud provider environment.

Various embodiments and implementations will now be described. The following description provides specific details for a thorough understanding and an enabling description of these embodiments implementations. One skilled in the art will understand, however, that the embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

1. EXAMPLE ENVIRONMENT

FIG. 1A illustrates an example environment 100 implementing a networked cloud architecture in which a system for resource modeling to specify and control placement of resources in a cloud environment (hereinafter "the system" or "resource requirement modeling system") can operate. The environment 100 can comprise a client device 110, networks 115/120, a cloud controller 125, the resource requirement modeling system 105 and one or more datacenters (e.g., datacenter 130-1, 130-2 and 130-3) in some embodiments.

In various embodiments, the cloud environment 100 can span multiple regions. As illustrated, the cloud environment 100 comprises region 1 including datacenters 130-3 and 130-2, and region 2 including Datacenter 130-1. The datacenters are typically geographically distributed. For example, Datacenter 130-2 may be located in Seattle, while Datacenter 130-2 may be located in San Francisco, covering the West US region. Similarly, Datacenter 130-1 may be located in New York, covering the East US region.

The datacenters can include the compute nodes or host machines (e.g., 135-1, 135-2, 135-2) which receive requests from the cloud controller 135. A compute node (e.g., 135-3) includes a hypervisor 150 that creates and runs one or more virtual machine instances or guest machines (e.g., virtual machines 145). The datacenters can also include storage (e.g., 140-1, 140-2, 140-3), and other hardware/software resources. The storage resource can be a local storage (e.g., storage that is physically coupled to the compute node) and/or a shared pool of storage accessed using a suitable data transfer technology such as Network File System (NFS), Internet Small Computer System Interface (iSCSI), fiber channel, or the like. The compute nodes are generally implemented on hardware and include one or more processors, memory, storage (e.g., disks), network cards, and/or the like, as will be described in greater detail below with respect to FIG. 5. The Hypervisor 150 implementation may be based on hardware, software, firmware or a combination thereof. One or more datacenters together can form a region.

In various embodiments, the client device 110 can be a desktop computer, a laptop, a tablet, a mobile device, a server, or any other processing device capable of communicating with other devices or servers via the network 115. For example, the client device 110 can communicate with the resource requirement modeling system 105, via the network 115. The client device 110 is typically operated by a client who is an application owner or who is requesting resources from the cloud environment. The network 115/120 can include various wired and/or wireless networks that enable communication between various devices.

In some embodiments, the resource requirement modeling system 105 can host an application or a web-based console ("console") that a client can access using the client device 110. The client can interact with the console to specify their resources requirements, which include the specification of the resources (e.g., compute nodes, VMs, storage, Memory) and their relationship. In some embodiments, the client can use a modeling language or a graphical representation thereof to specify their resource requirements as described in detail with reference to FIGS. 2 and 3 below. The resource requirement modeling system 105 can receive the resource requirements and translate them into a deployment model. In some embodiments, the deployment model can be stored in a repository 126 coupled to the resource requirement modeling system 105. In some embodiments, the client device 110 can request cloud resources by placing an order to implement a deployment model stored in the repository 126.

In some embodiments, the cloud controller 125 is a dedicated or centralized computing device configured to control the operations of the cloud. The cloud controller 125 is implemented on one or more servers or other suitable hardware, can include a storage device, memory and one or more processors, as will be described in greater detail below with respect to FIG. 5. In some embodiments, the cloud controller 125 can reside at a datacenter (e.g., datacenter 130-1, 130-2, 130-3) or elsewhere. In various embodiments, the cloud environment 100 may include multiple cloud controllers (not shown). Multiple cloud controllers can provide redundancy, such that in the event that one of the cloud controller fails, the control can failover to a second cloud controller. In some embodiments, the cloud environment 100 can include multiple cloud controllers so that the requests from client devices can be distributed among the cloud controllers. The cloud controller 125 can communicate with the different computing nodes in the different centers across the network 120, which can be any wired or wireless network.

The cloud controller 125 is a cloud management system that can manage allocation and/or placement of resources in response to receiving an order associated with a deployment model (e.g., from the resource requirement modeling system 105). The cloud controller 125 can provision the instances and IP addresses, and/or the like in accordance with the resource requirements specified by the deployment model. For example, the cloud controller 125 can manage allocation and de-allocation of resources such as the compute nodes (e.g., compute nodes 135-1 in Datacenter 130-1, compute nodes 135-2 in Datacenter 130-2, compute nodes 135-3 in Datacenter 130-3), storage (e.g., storage 140-1, 140-2, 140-3) and other hardware/software resources, including the instantiated virtual machines (e.g., virtual machines 145) and Hypervisor 150. For example, consider a deployment model that specifies two virtual machines on different datacenters but same region. When cloud controller 125 receives an order associated with the example deployment model, the cloud controller 125 allocates (e.g., by instantiating) VM1 from Datacenter 130-3, and VM3 from Datacenter 130-2 in region 1 to fulfill the order.

In some embodiments, each compute node (e.g., 135-1, 135-2, 135-3) includes a monitoring agent. As used herein, an "agent" refers to a mechanism manifested as software, firmware, hardware or any combination therewith. The monitoring agents can monitor the utilization of the resources (e.g., the virtual machines), and/or other operating parameters and collect statistics. For example, the monitoring agents can monitor and collect statistics on CPU utilization, memory utilization, response time or latency, network utilization, storage or disk utilization, and/or the like. In some embodiments, the statistics can be collected and reported periodically (e.g., every minute or every few minutes) to a utilization manager (not shown). The utilization manager can be a mechanism manifested as software, firmware, hardware or any combination therewith. The utilization manager can be implemented on a separate server, as part of the cloud controller 125 or the resource requirement modeling system 105. The utilization manager can thus utilize the reported statistics to validate utilization of the resources allocated to an application in accordance with a model for the application.

In some embodiments, the utilization manager can determine based on the reported statistics if the utilization and/or other operating parameters associated with a resource are consistently under their respective thresholds. If so, the utilization manager can cause the resource that is underutilized to be downsized (e.g., via the cloud controller 125). For example, if the utilization manager determines that a 6 core virtual machine is being underutilized, then the utilization manager can downsize it to 4 core virtual machine. In some embodiments, when one or more attributes of a resource associated with an application are updated in response to validating or verifying utilization of the resource, the corresponding model representing the requirement requirements of that application can also be updated. In this manner, utilization of resources in the cloud environment can be optimized, resulting in an efficient cloud environment.

It should be noted that in some embodiments, the resource requirement modeling system 105 can be wholly or partially implemented on the client device 110 or a server. In some embodiments, the resource requirements modeling system 105 can be implemented as a sub-system of the cloud controller 125.

Figure 1B:
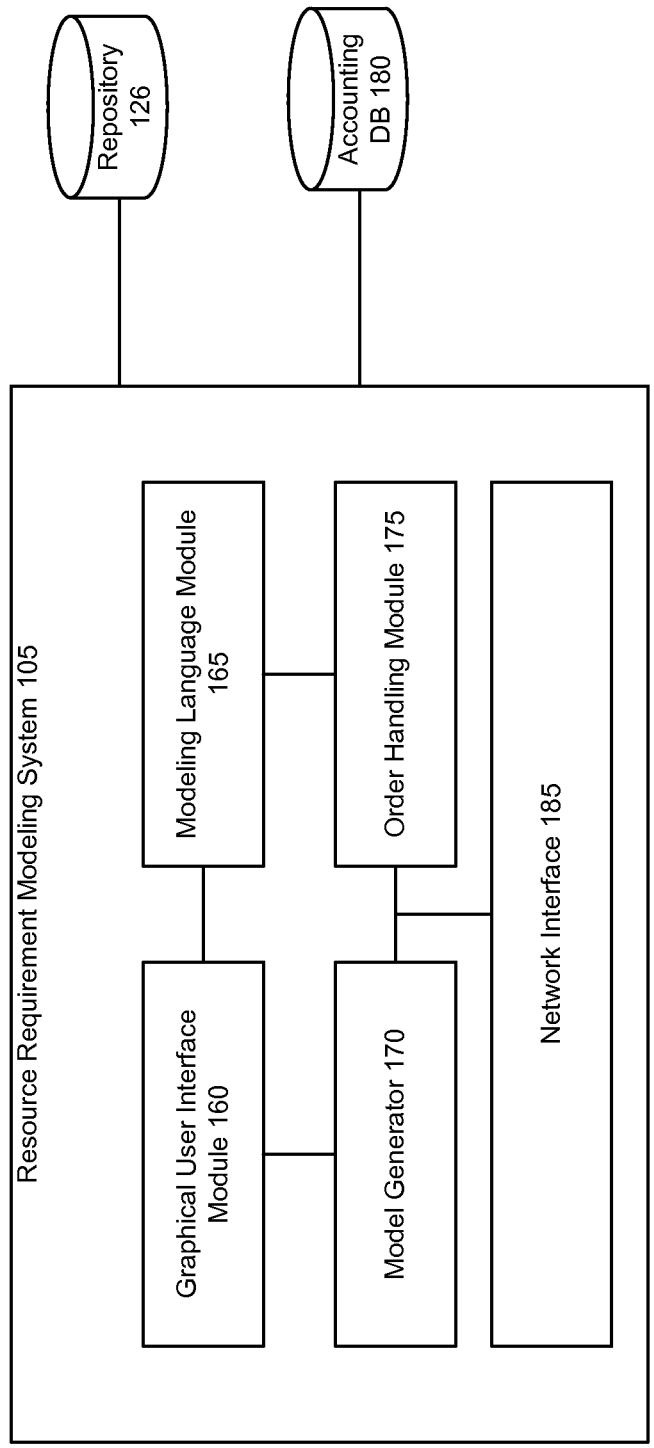
FIG. 1B illustrates example components of the resource requirement modeling system in some embodiments.

FIG. 1B illustrates example components of the resource requirement modeling system in some embodiments.

The system 105 can include a graphical user interface module 160, a modeling language module 165, a model generator 170, an order handling module 175, and a network interface 185 among other components. The system 105 can be coupled to access and/or store models (e.g., model files in XML or other suitable format) from the repository 126. In some embodiments, the system 105 can also communicate with an accounting database 180 to retrieve accounting information to associate with an order.

As used herein, a "module" and "a generator" include a general purpose, dedicated or shared processor and, typically, firmware or software modules that are executed by the processor. Depending upon implementation-specific or other considerations, the module and/or the generator can be centralized or its functionality distributed. The module and/or generator can include general or special purpose hardware, firmware, or software embodied in a computer-readable storage medium for execution by the processor.

The network interface 185 can be a networking module that enables the system 105 to mediate data in a network with an entity that is external to the system 105, through any known and/or convenient communications protocol supported by the host and the external entity. The network interface 185 can include one or more of a network adaptor card, a wireless network interface card (e.g., SMS interface, Wi-Fi interface, interfaces for various generations of mobile communication standards, Bluetooth, a router, an access point, a wireless router, a switch, a multilayer switch, a protocol converter, a gateway, a bridge, bridge router, a hub, a digital media receiver, and/or a repeater. The external entity can be any device capable of communicating with the system 105, and can include client devices 110 from FIG. 1A, the cloud controller 125, and/or the like illustrated in FIG. 1A.

In some embodiments, the graphical user interface module 160 provides a graphical user interface with which clients can interact to model resource requirements of an application in a cloud environment. The user interface can includes various icons representing resources such as compute, database, messaging, storage, legacy hosts, or the like. Clients can drag and drop one or more resource nodes using the icons into an area of the user interface, select any two or more resource nodes to create a group, and apply a constraint selected from a menu to the group. In this manner, clients can graphically model the resource requirements of the application. In some embodiments, the graphical user interface module 160 can also provide an interface for textually inputting a model of resource requirements of the application using the modeling language.

The modeling language module 165 can provide a set of notations and constructs to define the specification of a given resource and a set of relationships among the resources. For example, the modeling language module 165 can provide, for each resource, vocabulary that describe its attributes such as shape, operating system, software, configuration, location, etc., specification that describes a set of shapes and image, and/or limitations. In some embodiments, the relationship can be established on any attribute of the resources. For example, a relationship can specify that two resources be placed on the "same datacenter," have VMs on the same hypervisor or different hypervisor, or have resources on the same/different subnet. These constraints are not specific to a given cloud provider (or resource provider), but define the relationships among the resources themselves. Information from the modeling language module 165 can be used by the graphical user interface module 160 to enable clients to assign or update attributes, for example. A model generator 170 can use the vocabulary, specification and/or limitations of a given resource provided by the modeling language module 165 and the resource specification and relationships input in the graphical user interface to create a model of the resource requirements. In some embodiments, the model can be a file encoded in XML and/or other languages. The model can be stored in the repository 126.

The order handling module 175 can handle requests from clients to instantiate a model stored in the repository 126. The order handling module 175 can create and place an order to a cloud controller (e.g., cloud controller 125) for fulfillment. In some embodiments, the order can include information identifying or referencing the model. In some embodiments, the order can also include accounting information identifying a group or entity to be charged (e.g., accounting information retrieved from the accounting database or table 180). The fulfillment of the order by the cloud controller 125 causes instantiation of the resource nodes in accordance with the relationships defined in the model.

2. RESOURCE POOL DEFINITION

A cloud can provide a number of resources including, but not limited to: compute, storage, database (DB), messaging, network, and/or the like. These resources can be provided by different groups or divisions within an organization, in some embodiments. The Resource Pool Definition defines the specification and behavior of a given resource. The Resource Pool Definition is an abstract notion which provides different dimensions for specifying different aspects of a resource. Each dimension is called Classification. For example the compute resource includes the example classifications shown in table 1 below.

TABLE 1

| Example Classifications of the compute Resource Classifications |
|---|
| Physical |
| Operation System |
| Configuration |
| Software Packages |
| Support SLA (Service Level Agreement) |

Each Classification has a number of attributes. Attributes can be primitive or complex. Example of primitive attributes for Physical Classification includes, but is not limited to: core, memory, storage, and/or the like. The complex attribute is an expression utilizing the primitive attributes. For example, Shape is a complex attribute in Physical Classification with the possible (or example) values shown in Table 2 below.

TABLE 2

Example values of Shape (a complex attribute in Physical Classification).

Values

Small {core = 2 & memory = 8 & storage = 60}
Medium {core = 4 & memory = 16 & storage = 100}
Large {core = 8, memory = 32 & storage = 200}

Similarly, Image is a primitive attribute in Operation System with the possible (or example) values such as Windows or Linux, or any other suitable operating systems.

Another aspect of Resource Pool Definition is a list of datacenters that this Resource Pool has presence in and finally the list of restrictions. For example, "Windows cannot be installed on a Large Shape."

The Classifications and list of Attributes for each Classification may be different for different Resource Pool Definitions. For example, Resource Pool Definition for storage may have Classifications in terms of: (1) Performance, (2) Latency and/or (3) Technology.

Just as Resource Pool Definition captures the list of possible offerings and choices, Bean defines a set of selections (one selection from each Classification) from a Resource Pool. For example, Bean Linux6.1Small is defined as:

(1) Physical: Shape=Small (2) Operation System: Image=Linux; Image Version=6.1

(3) Configuration: System Account="foo"

(4) Software Package: Infrastructure={Java, tomcat}

(5) Support: SLA={Self Service, Replace on failure, etc.}

Thus, Bean defines the specification of a given resource. A Deployment Model captures the specification of all required resources and their relationship. Thus, a Deployment Model is a collection of nodes (each node is represented by a Bean) and a set of relationship. The relationship among nodes is represented via Constraints which is described in detail in the next section.

3. CONSTRAINT

Constraints are defined as:

| LHS | Operator | RHS |
| --- | --- | --- |

The Left Hand Side (LHS) is defined as:

| Identifier* | Classification | Attribute |
| --- | --- | --- |

The operators include: {=,!=, <, <=, >=, >, in, between}

The Right Hand Side (RHS) is defined as:

| Literal |
| --- |

| Identifier* | Classification | Attribute |
| --- | --- | --- |

The following example denotes the requirements that two nodes on the deployment model, namely B101 and B102, should be on different data centers but the same region.

(a) B101.Location.DataCenter !=B102.Location.DataCenter (b) B101.Location.Region=B102.Location.Region

4. RESOURCE POOL

Resource Pool Definition is a mechanism to define the vocabulary, specification, and limitations of a resource. By way of example, the vocabulary, specification and limitations of the compute resource is depicted in table 3 below.

TABLE 3

Compute Resource Pool

| Vocabulary | Specification | Limitations |
| --- | --- | --- |
| Shape | A set of Shapes | Support (Image = |
| Core | Small: Core = 2; | Windows) where |
| Memory | Memory = 8 G; | (shape = Large) |
| Storage | Storage = 100 G | |
| Operation System (OS) | Medium: Core = 4; | |
| Image | Memory = 16 G; | |
| Version | Storage = 300 G | |
| Software | Large: Core = 16; | |
| Configuration | Memory = 96 G; | |
| | Storage = 1 T | |
| Location | Image | |
| Hypervisor | Linux | |
| Cabinet | Windows | |
| Row | | |
| Datacenter | | |
| City | | |
| Region | | |

In an embodiment, each Resource Pool can be offered and implemented by an independent Resource Pool provider (e.g., a department or group within an organization) as long as they implement a set of services such as, but not limited to:

Validation Service: To make sure a given specification of a resource is valid syntactically and semantically.

Pricing Service: To calculate the cost of resource usage.

Reservation Service: To reserve the resource with the given set of constraints such as location, specification, or the like.

In some embodiments, the constraints can span over multiple resource pools. For example, one constraint may specify that the storage and compute resource pools are to be in the same datacenter. To accommodate the implementation of constraints spanning over multiple resource pools (note that resource pool providers can be in different process spaces), an external coordinator (e.g., cloud controller 125 of FIG. 1A) can resolve the constraints (e.g., if there are multiple solutions satisfying the constraints) and tryout each solution with all resource pools involved. When and only when all resource pool providers have enough capacity to fulfill the request, the cloud controller 125 would commit to the request.

As described above, the model is the representation of the intent, denoting the number of required resources, type and specification of resources (Beans) and the relationship among them (i.e., topology). A model for an application can be created via a User Interface provided by the system 105 of FIG. 1A and can be saved in a repository and subsequently modified as many times as needed before ordering.

Order (very much like model) can be an XML file (or a file in another suitable format) which includes accounting information (e.g., Department to be charged, etc.) in addition to a reference to the Model. Fulfilling the order means realizing or implementing an instance of the Model. Thus, the Model captures the intent and Instance represents the actual resources. Thus, for an application Deployment Model with two compute resources, the Model has two nodes each referencing a compute Bean (e.g. Small-Linux6.1), however, the instance refers to the actual two VMs that are created, with host names (e.g., hosts d11012-01.dc.gs.com and d11012-02.dc.gs.com) and IP addresses, etc.

5. GRAPHICAL USER INTERFACE (GUI)

In various embodiments, clients interact with the cloud environment via a user interface (referred to herein as "canvas") of an application or web-based console that translates the user inputs into a set of constraints and passes them on to the cloud controller 125 for processing and fulfillment.

Figure 2:
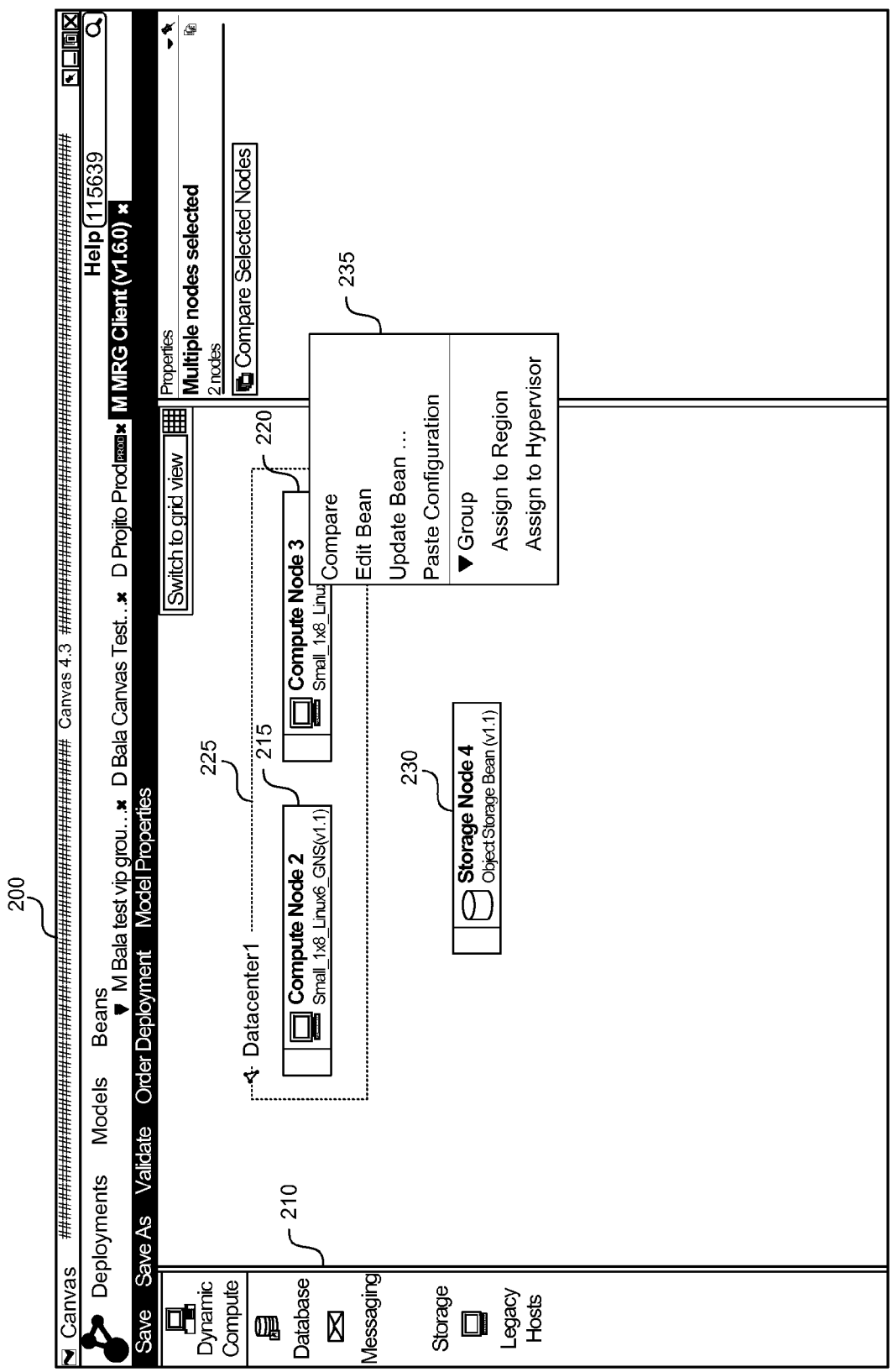
FIGS. 2 and 3 illustrate example screenshots of user interfaces of the system in some embodiments.

As depicted in FIG. 2, a list of resources 210 such as dynamic compute, database, messaging, storage and legacy hosts is displayed on the left hand side of the Canvas 200. Clients can model their resource requirements by dragging and dropping the beans to the middle section of the Canvas 200. Constraints can be assigned to one or more nodes by highlighting or selecting them (thereby creating a group) and selecting an applicable constraint from the menu 235. For example, in FIG. 2, "compute node 2" (215) and "compute node 3" (220) are assigned to the same "Datacenter 1" (225). "storage node 4" (230) has no constraints associated with it.

Figure 3:
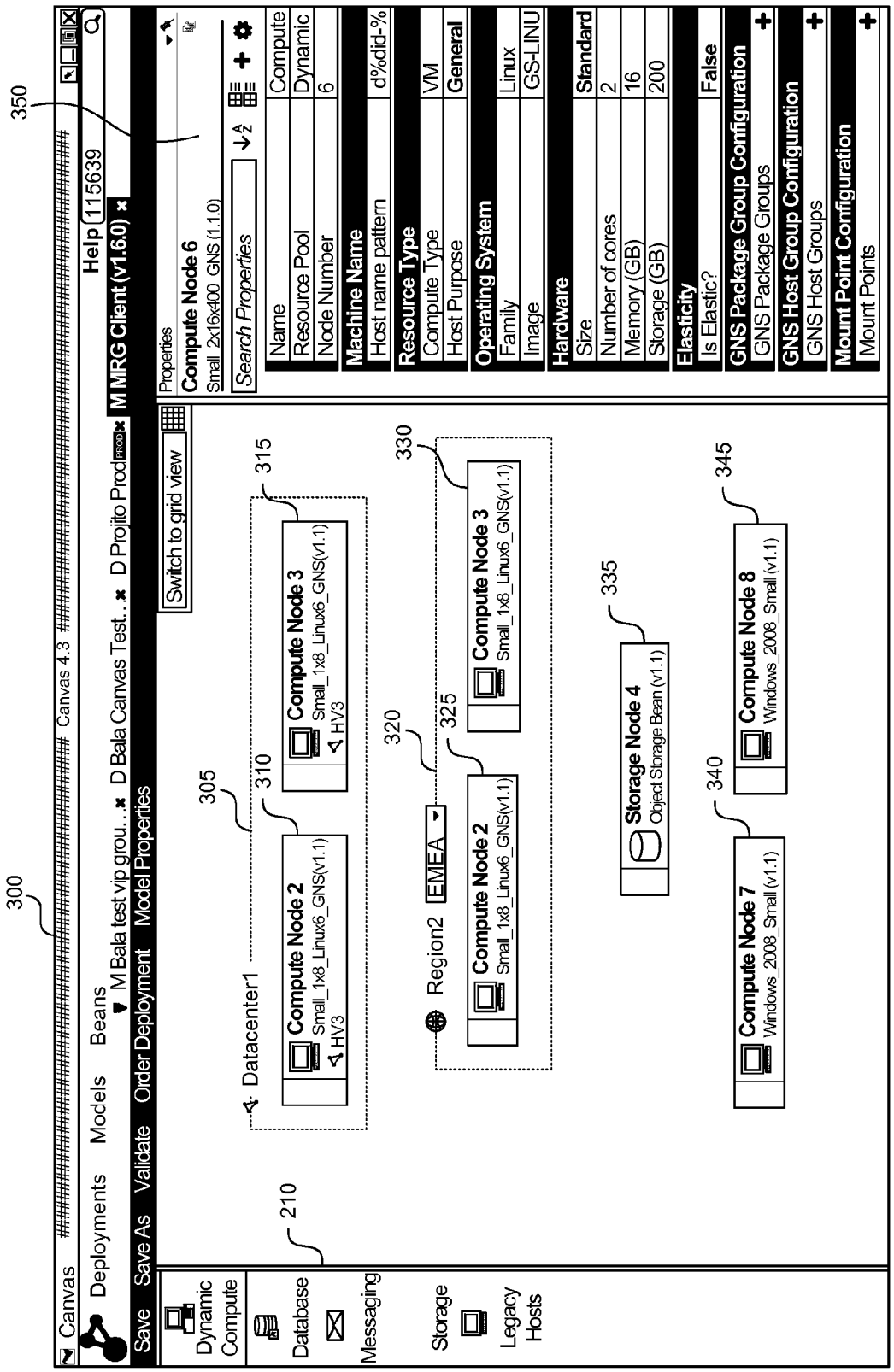

Canvas 300 depicted in FIG. 3 shows that the "compute node 2" (310) and "compute node 3" (315) are more constrained than the corresponding nodes shown in FIG. 2. For example, the compute nodes 310 and 315 are assigned to the same "Datacenter 1" (305) and the same Hypervisor "HV3." "compute node 5" (325) and "compute node 6" (330) are placed in the same "Region 2" (320), while the "storage node 4" (335) and the compute nodes 7 and 8 (340 and 345 respectively) are constraint free. Canvas 300 also depicts attributes of the selected "compute node 6" (330) on the right hand side panel 350 of the Canvas 300. For example, the "compute node 6" is Clients can also assign other attributes such as additional configuration and software to be installed on the selected node.

6. EXAMPLE METHOD

Figure 4:
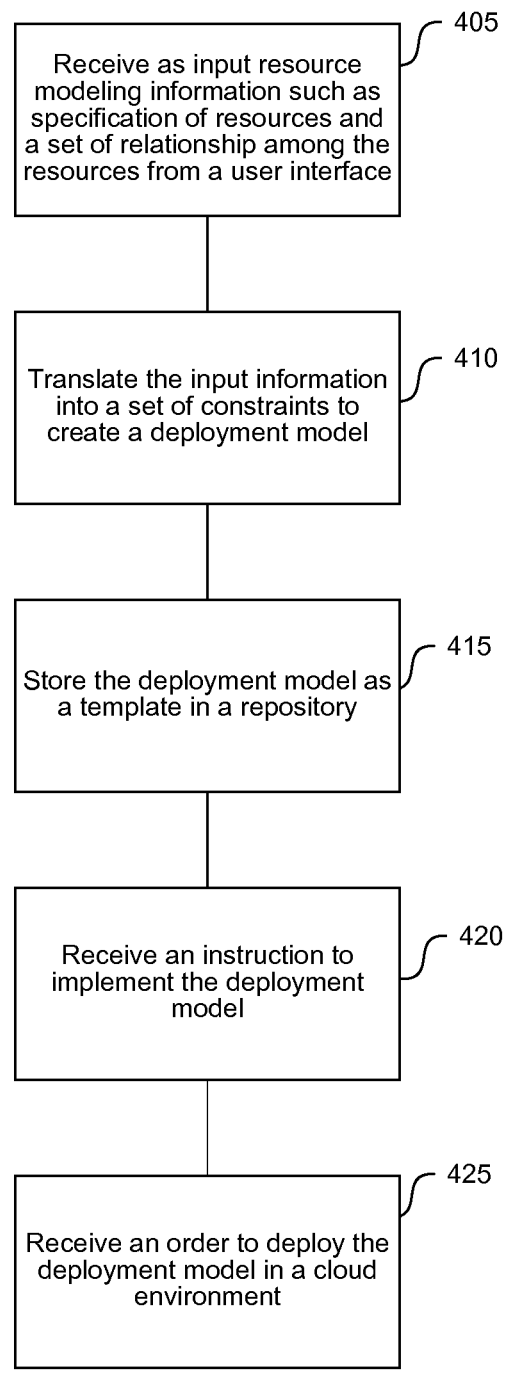
FIG. 4 illustrates an example logic flow diagram of a method for modeling the resource requirements of an application in some embodiments.

FIG. 4 illustrates an example logic flow diagram of a method for modeling the resource requirements of an application. As illustrated, a system receives as input resource modeling information such as specification of resources and a set of relationship among the resources via a user interface at block 405. In some embodiments, a client can specify the resources graphically, for example, by dragging and dropping resources into a defined area of the user interface. The client can also set the relationships between the resources graphically, for example, by grouping two or more resources and applying a constraint selected from a menu. For example, the client can select two compute nodes and apply "Assign to Datacenter" constraint, which would translate into a resource specification that specifies that the two compute nodes should be placed in the same Datacenter.

At block 410, the system translates the input information into a set of constraints to create a deployment model. A deployment model is a collection of nodes, wherein each node is represented by a bean (i.e., a set of specification from a resource pool for a resource) and a set of relationship.

In some embodiments, at block 415, the system stores the deployment model as a template in a suitable format (e.g., an XML file) in a repository. The template can be modified as many times as desired. At block 420, the system receives an instruction from the client to implement the deployment model (or any other deployment model in the repository). At block 425, in response to the instruction, the system creates and places an order to implement the specified deployment model in a cloud environment. In some embodiments, the order is a file such as an XML file that includes information such as accounting information and a reference to the deployment model stored in the repository. The order file can be forwarded to a cloud controller (e.g., cloud controller 125) for processing and fulfilling the order. In some embodiments, the cloud controller can process and fulfill the order by instantiating the deployment model. Instantiating the deployment model creates the actual resources (e.g., creates the virtual machines). In some embodiments, processing and fulfilling of the order can include resolving the constraints specified in the deployment model when multiple solutions are available. The cloud controller can try out each solution to ensure that there is enough capacity to fulfill the order before committing to the order.

In some embodiments, once the order is fulfilled, and the resources are instantiated in accordance with the model, a utilization manager (e.g., the utilization manager described in reference to FIG. 1A) can collect statistics on the utilization and/or other operating parameters of the resources. Based on the collected statistics, the utilization manager can validate that the resources are being utilized in accordance with the model. In some embodiments, if the utilization of a resource is below a threshold, the utilization manager can adjust one or more attributes of the resource to optimize the utilization of the resources.

7. EXAMPLE COMPUTER SYSTEMIZATION

Figure 5:
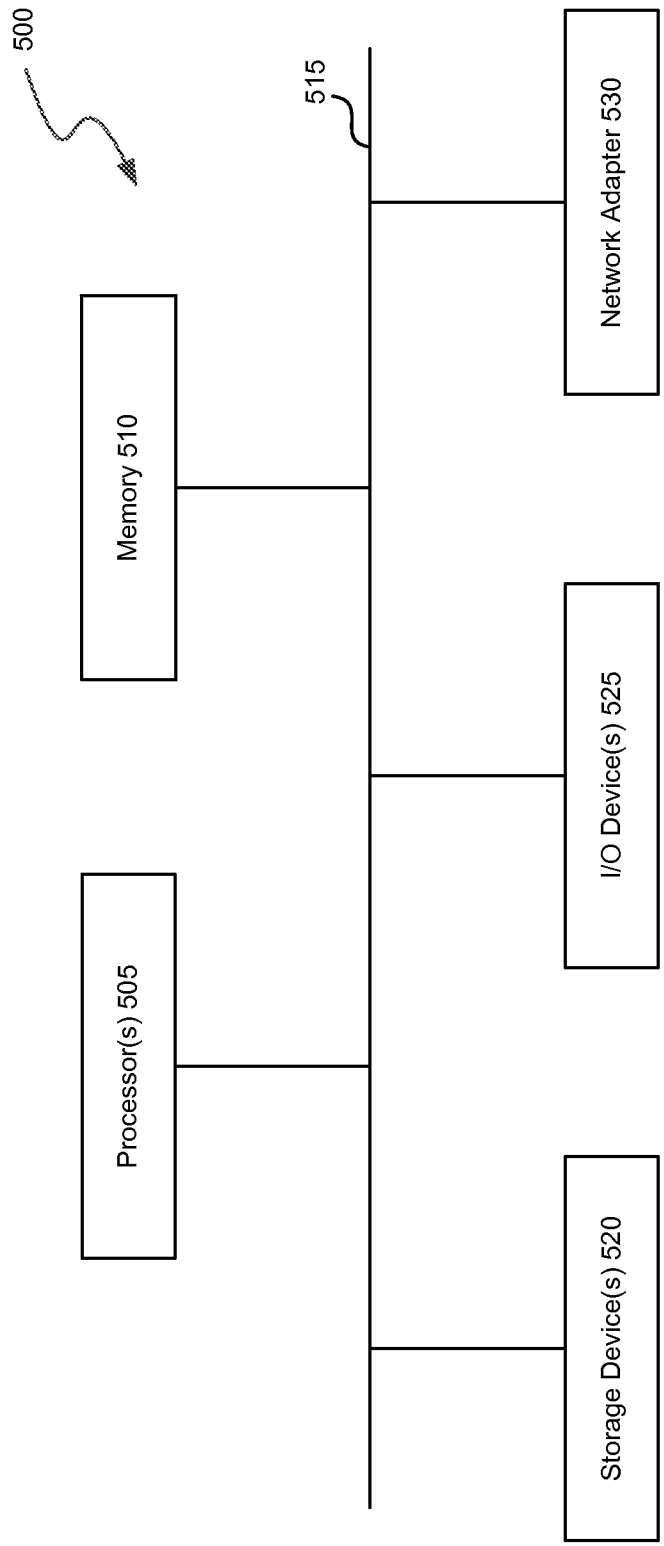
FIG. 5 is a block diagram of an exemplary apparatus that may perform various operations, and store various information generated and/or used by such operations as described in this application.

FIG. 5 is a block diagram of an exemplary apparatus that may perform various operations, and store various information generated and/or used by such operations as described in this application.

The apparatus 500 can represent any computer system described herein. The computer 500 is intended to illustrate a hardware device on which any of the entities, components or services depicted in the examples of FIGS. 1A and 1B (and any other components described in this specification) can be implemented. For example, any of the compute nodes 135-1, 135-2, 135-3 (host machines), client device 110, guest machines, resource requirement modeling system 105 and cloud controller 125 of FIG. 1A can be implemented on the computer 500. The computer 500 includes one or more processors 505 and memory 510 coupled to an interconnect 515. The interconnect 515 as shown in FIG. 5 can represent any one or more separate physical buses, point to point connections, or both connected by appropriate bridges, adapters, or controllers. The interconnect 515, therefore, may include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, an Institute of Electrical and Electronics Engineers (IEEE) standard 1394 bus, also called "Firewire," and/or the like.

The processor(s) 505 is/are the central processing unit (CPU) of the computer 500 and, thus, control the overall operation of the computer 500. In certain embodiments, the processor(s) 505 accomplish this by executing software or firmware stored in memory 510. The processor(s) 505 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 510 is or includes the main memory of the computer 500. The memory 510 represents any form of random access memory (RAM), read-only memory (ROM), flash memory, or the like, or a combination of such devices. In use, the memory 510 may comprise a code. In one embodiment, the code includes a general programming module configured to recognize the general-purpose program received via the computer bus interface, and prepare the general-purpose program for execution at the processor. In another embodiment, the general programming module may be implemented using hardware circuitry such as ASICs, PLDs, or field-programmable gate arrays (FPGAs).

Also connected to the processor(s) 505 through the interconnect 515 are a network adapter 530, a storage device(s) 520 and I/O device(s) 525. The network adapter 530 provides the computer 500 with the ability to communicate with remote devices, over a network and may be, for example, an Ethernet adapter or Fibre Channel adapter. The network adapter 530 may also provide the computer 500 with the ability to communicate with other computers within the cluster. In some embodiments, the computer 500 may use more than one network adapter to deal with the communications within and outside of the cluster separately.

The I/O device(s) 525 can include, for example, a keyboard, a mouse or other pointing device, disk drives, printers, a scanner, and other input and/or output devices, including a display device. The display device can include, for example, a cathode ray tube (CRT), liquid crystal display (LCD), or some other applicable known or convenient display device.

The code stored in memory 510 can be implemented as software and/or firmware to program the processor(s) 505 to carry out actions described above. In certain embodiments, such software or firmware may be initially provided to the computer 500 by downloading it from a remote system through the computer 500 (e.g., via network adapter 530).

The embodiments and implementations of the technology disclosed herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Software or firmware for use in implementing the technology disclosed herein may be stored on a machine-readable storage medium and may be executed by one or more general-purpose or special-purpose programmable microprocessors. A "machine-readable storage medium," as the term is used herein, includes any mechanism that can store information in a form accessible by a machine.

A machine can also be a server computer, a client computer, a personal computer (PC), a tablet PC, a laptop computer, a set-top box (STB), a personal digital assistant (PDA), a web appliance, a graph data appliances, a network router, switch or bridge, or any machine capable of executing a set of instructions (sequential or otherwise) that specify actions to be taken by that machine.

A machine-accessible storage medium or a storage device(s) 520 includes, for example, recordable/non-recordable media (e.g., ROM; RAM; magnetic disk storage media; optical storage media; flash memory devices; etc.), etc., or any combination thereof. The storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

8. CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

These and other changes can be made to the disclosure in light of the above Detailed Description. While the above description describes certain embodiments of the disclosure, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments and implementations have been described herein for purposes of illustration, but that various modifications may be made without deviating from the spirit and scope of the embodiments and implementations. Accordingly, the embodiments and implementations are not limited except as by the appended claims.

What is claimed is:

1. A method comprising:
    receiving, by a computer system, resource modeling information representing resource requirements of an application for deployment in a first cloud environment that includes one or more datacenters in one or more regions on different subnets, the resource modeling information including a specification of multiple resources and a set of rules for placement of the resources in the first cloud environment, wherein the set of rules defines relationships among the resources;
    creating, by the computer system, a model based on the received resource modeling information, wherein creating the model includes translating the received resource modeling information into a set of constraints;
    storing, by the computer system, the model including the set of constraints in a data repository that is coupled to the computer system;
    receiving, by the computer system, a request to deploy the model in the first cloud environment; and
    creating, by the computer system in response to receiving the request, an order to deploy the model and sending the order to a cloud controller of the first cloud environment.

2. The method of claim 1, wherein:
    the order identifies the model to be deployed and accounting information associated with a department or group to be charged for usage of the resources, and
    the first cloud environment is a private cloud environment.

3. The method of claim 1, wherein the model is retrievable from the data repository and deployable in a second cloud environment different from the first cloud environment.

4. The method of claim 1, wherein the resources in the first cloud environment include one or more of: a computing resource, a storage resource, a database resource, or a messaging resource.

5. The method of claim 1, wherein:
    the specification of the multiple resources comprises a specification of each resource,
    the specification of each resource includes a set of selections from a resource pool for that resource, and
    the resource pool defines the specification and one or more behaviors of the resource in the first cloud environment.

6. The method of claim 5, wherein a resource pool definition for each resource includes one or more classifications, each classification having multiple primitive or complex attributes.

7. The method of claim 1, further comprising:
    retrieving the model or another model stored in the data repository;
    utilizing the retrieved model as a template to create a new model representing resource requirements of the application or another application;
    receiving a request to deploy the new model in the first cloud environment; and
    in response to receiving the request, deploying the new model in the first cloud environment.

8. The method of claim 1, wherein the resource modeling information is input graphically via a user interface displayed on a client device that is communicatively coupled to the computer system over a network.

9. The method of claim 1, wherein the resource modeling information is input textually via a user interface displayed on a client device that is communicatively coupled to the computer system over a network.

10. The method of claim 1, wherein each constraint of the set of constraints is defined by two resources separated by a mathematical operator.

11. A system comprising:
    at least one memory; and
    at least one processor in communication with the at least one memory, the at least one processor configured to:
        receive, via a user interface displayed on a client device, resource modeling information comprising a specification of multiple resources in a cloud environment that includes one or more datacenters in one or more regions, the specification including at least one number and at least one type of the resources, the resource modeling information further comprising a set of rules for placement of the resources in the cloud environment, wherein the set of rules defines relationships among the resources;
        create a model for an application based on the received resource modeling information, wherein the at least one processor is configured to create the model by translating the received resource modeling information into a set of constraints;
        store the model including the set of constraints in the at least one memory; and
        place an order identifying the model to a cloud controller system to cause the resources to be instantiated in the cloud environment in accordance with the model.

12. The system of claim 11, wherein each constraint defines a relationship among the resources.

13. The system of claim 12, wherein the relationship among the resources specifies that two or more of the resources be placed (i) in different regions of a same hypervisor, (ii) relative to a known entity, (iii) in a same datacenter, or (iv) in different datacenters.

14. The system of claim 12, wherein the at least one type of the resources includes a storage resource, a computing resource, a database resource, or a messaging resource.

15. The system of claim 14, wherein each resource has an associated vocabulary.

16. The system of claim 11, wherein:
    the at least one memory comprises a repository, and
    the model for the application is stored in the repository and is modifiable into a new model for another application for deployment in the cloud environment or a different cloud environment.

17. The system of claim 11, wherein the at least one processor is configured to place the order in response to a request from the client device, and wherein the order includes accounting information and a reference to the model.

18. The system of claim 11, wherein the order is successfully fulfilled when there is enough capacity to fulfill the order to satisfy the constraints of the model.

19. A non-transitory computer-readable storage medium storing instructions that, when executed by at least one processor, cause the at least one processor to:
- receive resource modeling information representing resource requirements of an application for deployment in a first cloud environment that includes one or more datacenters in one or more regions on different subnets, the resource modeling information including a specification of multiple resources and a set of rules for placement of the resources in the first cloud environment;
- create a model for the application based on the received resource modeling information, wherein creating the model includes translating the received resource modeling information into a set of constraints;
- store the model including the set of constraints in a data repository; and
- place an order identifying the model for the application for fulfillment by a cloud controller system.

20. A method comprising:
- providing, for display on a client computer, a user interface that includes a plurality of icons representing a plurality of resources for graphically modeling resource requirements of an application in a distributed computer network;
- in response to detecting that at least two resource nodes corresponding to at least one of the plurality of icons have been moved into a first area of the user interface displayed on the client computer, selecting the at least two resource nodes to create a group and applying a constraint selected from a menu to the group;
- creating a model of the resource requirements of the application based on the at least two resource nodes and a relationship among the at least two resource nodes represented by the constraint; and
- storing the model as a template in a datastore.

21. The method of claim 20, further comprising:
- in response to a selection of one of the resource nodes from the at least two resource nodes, displaying a list of attributes assigned to the selected resource node in a second area of the user interface; and
- receiving at least one of additional configuration information or software to be installed on the selected resource node.

22. The method of claim 20, further comprising:
- receiving a request to instantiate the model stored in the datastore; and
- in response to the request, placing an order to a cloud controller system for fulfillment, wherein the order includes information identifying the model and accounting information identifying a group or entity to be charged, wherein fulfillment of the order causes instantiation of the at least two resource nodes in accordance with the relationship between the at least two resource nodes.

* * * * *